US012333558B2

(12) United States Patent
Walter et al.

(10) Patent No.: US 12,333,558 B2
(45) Date of Patent: Jun. 17, 2025

(54) TECHNIQUES FOR GENERATING ANALYTICS REPORTS

(71) Applicant: Google LLC, Mountain View, CA (US)

(72) Inventors: Matthew Thompson Walter, Ladera Ranch, CA (US); Michael Joseph Valenty, Carlsbad, CA (US); Sundardas Samuel Dorai-Raj, Campbell, CA (US); Moshe Lichman, Costa Mesa, CA (US); Manish Agrawal, Sunnyvale, CA (US); Joseph Kelly, Brooklyn, NY (US); Michael Andrew Wallace, San Francisco, CA (US); Stephen Paul Ganem, Huntington Beach, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/925,486

(22) PCT Filed: Jun. 17, 2022

(86) PCT No.: PCT/US2022/034017
§ 371 (c)(1),
(2) Date: Nov. 15, 2022

(87) PCT Pub. No.: WO2023/244244
PCT Pub. Date: Dec. 21, 2023

(65) Prior Publication Data
US 2024/0232913 A1 Jul. 11, 2024

(51) Int. Cl.
*G06Q 10/00* (2023.01)
*G06Q 30/0201* (2023.01)
*G06Q 30/0601* (2023.01)

(52) U.S. Cl.
CPC ..... *G06Q 30/0201* (2013.01); *G06Q 30/0633* (2013.01)

(58) Field of Classification Search
None
See application file for complete search history.

(56) References Cited

U.S. PATENT DOCUMENTS 10,705,796 B1 * 7/2020 Doyle .................. G06F 16/282
10,819,812 B2 * 10/2020 Foged ..................... H04L 51/52
(Continued)

FOREIGN PATENT DOCUMENTS

CN   106600344   7/2020

OTHER PUBLICATIONS

Keselj, Ana, The Application of Deep Learning for the Evaluation of User Interfaces, 2022, Sensors, Sensors 2022, 22, 9336. https://doi.org/10.3390/s22239336, https://www.mdpi.com/journal/sensors, p. 1-17. (Year: 2022).*

(Continued)

*Primary Examiner* — Joseph M Waesco
(74) *Attorney, Agent, or Firm* — DORITY & MANNING P.A.

(57) ABSTRACT

Techniques for generating a report for a website are presented herein. A method can include accessing, by one or more computing devices, a plurality of unidentified events. Each event in the plurality of unidentified events can be associated with one or more properties. Additionally, the method can calculate, using a machine-learned prediction model, a number of pseudo users associated with the plurality of unidentified events based on an event-to-user-ratio and a total number of unidentified events. Moreover, the method can include assigning a first event from the plurality of unidentified events to a first pseudo user based on the one or more properties of the first event. Furthermore, the
(Continued)

method can include generating the report for the website. The report includes information derived from the first event being assigned to the first pseudo user.

19 Claims, 8 Drawing Sheets

(56) References Cited

U.S. PATENT DOCUMENTS

| | | | | |
|---|---|---|---|---|
| 2007/0011039 | A1* | 1/2007 | Oddo | G06Q 30/0201 |
| | | | | 705/7.33 |
| 2016/0086108 | A1* | 3/2016 | Abelow | G06Q 30/02 |
| | | | | 705/7.29 |
| 2016/0148273 | A1* | 5/2016 | Ling, III | G06F 40/143 |
| | | | | 705/14.67 |
| 2016/0162982 | A1* | 6/2016 | Calman | G06V 20/46 |
| | | | | 705/26.41 |
| 2016/0163000 | A1* | 6/2016 | Calman | G06V 20/20 |
| | | | | 705/26.8 |
| 2016/0267506 | A1* | 9/2016 | Calman | G06Q 30/0631 |
| 2016/0267507 | A1* | 9/2016 | Calman | G06Q 30/0201 |
| 2017/0228355 | A1* | 8/2017 | Ling, III | G06Q 30/02 |
| 2017/0299624 | A1* | 10/2017 | Jain | G01P 15/00 |
| 2018/0315060 | A1* | 11/2018 | Sheppard | G06Q 30/0203 |
| 2019/0095411 | A1* | 3/2019 | Ling, III | H04L 51/18 |
| 2020/0327444 | A1* | 10/2020 | Negi | G06N 3/04 |
| 2022/0005063 | A1* | 1/2022 | Neuenschwander | G06N 3/045 |
| 2022/0043412 | A1* | 2/2022 | Dedul | F24D 11/005 |
| 2022/0109685 | A1* | 4/2022 | Hankins | H04L 63/0227 |

OTHER PUBLICATIONS

Google Analytics, "Behavioral Modeling for Consent Mode", https://support.google.com/analytics/answer/11161109, retrieved Dec. 8, 2022, 3 pages.

Google Analytics, Reporting Identity, https://support.google.com/analytics/answer/10976610?visit_id=638048203528111910-1222327955&rd=1, retrieved Dec. 8, 2022, 3 pages.

International Search Report and Written Opinion for PCT/US2022/034017, mailed on Feb. 9, 2023, 11 pages.

International Preliminary Report on Patentability for Application No. PCT/US2022/034017, mailed Dec. 26, 2024, 7 pages.

* cited by examiner

TECHNIQUES FOR GENERATING ANALYTICS REPORTS

PRIORITY CLAIM

This application is based upon and claims the right of priority under 35 U.S.C. § 371 to International Application No. PCT/US2022/034017, filed Jun. 17, 2022, which is hereby incorporated by reference herein in its entirety.

FIELD

The present disclosure relates generally to automatically generating data analytics reports for a website. More particularly, the present disclosure relates to techniques for using machine-learned prediction models to determine information (e.g., number of users, number of sessions) associated with a plurality of unidentified events.

BACKGROUND

Website owners may want to understand what content a user has been exposed to, which campaigns provided the best performance, and touchpoints that were important in driving conversions. However, understanding the actions users take after interacting with a content item or impression is a challenge because there can be gaps in the information available to website owners. Additionally, users may interface with a website using different browsers and devices. Moreover, users may research a product online and then purchase the product offline. Website owners need to make data-driven decisions and focus on enhancing the customer journey.

SUMMARY

Aspects and advantages of embodiments of the present disclosure will be set forth in part in the following description, or can be learned from the description, or can be learned through practice of the embodiments.

The present disclosure provides systems and methods for using machine-learned prediction models to generate analytics data for an analytics report. The analytics data may contain user identified data and unidentified data (e.g., events which can lack a stable user identifier). The machine-learned prediction model can estimate business metrics from the unidentified events. The business metrics can include a number of users, a number of sessions, along with other dimensions like gender and ad campaigns. The system can internally combine metrics from identified data with the estimates from unidentified data (e.g., unidentified events) to give a complete analytics report which can be used for business decision making.

One example aspect of the present disclosure is directed to a computer-implemented method. The method can include accessing, by one or more computing devices, a plurality of unidentified events. The plurality of unidentified events have a total number of unidentified events. For example, the unidentified events can be associated with events without a user identifier (e.g., stable user identifier). Each event in the plurality of unidentified events can be associated with one or more properties. Additionally, the method can include calculating, using a machine-learned prediction model, a number of pseudo users associated with the plurality of unidentified events based on an event-to-user-ratio and the total number of unidentified events. Moreover, the method can include assigning, using the machine-learned prediction model, a first event from the plurality of unidentified events to a first pseudo user based on the one or more properties of the first event. Furthermore, the method can include generating the analytics report for the website. The analytics report can include information derived from the number of pseudo users and the first event being assigned to the first pseudo user.

Another example aspect of the present disclosure is directed to a computing system, comprising one or more processors and one or more non-transitory computer-readable media. The one or more non-transitory computer-readable media can collectively store a machine-learned prediction model and instructions that, when executed by the one or more processors, cause the computing system to perform operations. The machine-learned prediction model is configured to generate an event-to-user-ratio based on data derived from a plurality of identified events associated with identified users of the website that have accepted identifiers when browsing the website. The operations can include accessing a plurality of unidentified events. For example, the unidentified events can be associated with events without a user identifier (e.g., stable user identifier). The plurality of unidentified events have a total number of unidentified events. Each event in the plurality of unidentified events can be associated with one or more properties. Additionally, the operations can include calculating, using the machine-learned prediction model, a number of pseudo users associated with the plurality of unidentified events based on the event-to-user-ratio and the total number of unidentified events. Moreover, the operations can include assigning, using the machine-learned prediction model, a first event from the plurality of unidentified events to a first pseudo user based on the one or more properties of the first event. Furthermore, the operations can include generating the analytics report for the website. The analytics report can include information derived from the number of pseudo users and the first event being assigned to the first pseudo user. In some implementations, a processing parameter of the system can be adjusted based on the data from the generated analytics report.

Yet another example aspect of the present disclosure is directed to one or more non-transitory computer-readable media comprising instructions that when executed by one or more computing devices cause the one or more computing devices to perform operations. The operations can include accessing a plurality of unidentified events. For example, the unidentified events can be associated with events without a user identifier (e.g., stable user identifier). The plurality of unidentified events have a total number of unidentified events. Each event in the plurality of unidentified events being associated with one or more properties. Additionally, the operations can include calculating, using a machine-learned prediction model, a number of pseudo users associated with the plurality of unidentified events based on an event-to-user-ratio and the total number of unidentified events. Moreover, the operations can include assigning, using the machine-learned prediction model, a first event from the plurality of unidentified events to a first pseudo user based on the one or more properties of the first event. Furthermore, the operations can include generating the analytics report for the website. The analytics report can include information derived from the number of pseudo users and the first event being assigned to the first pseudo user.

In some implementations, the machine-learned prediction model can determine the event-to-user-ratio based on data derived from a plurality of identified events associated with identified users of the website that have accepted identifiers when browsing the website. In some instances, the data derived from the plurality of identified events can be first-party data from the website.

In some implementations, the first event can be associated with a first property. Additionally, the method can further include selecting, based on the first property of the first event, a subset of similar users from the plurality of identified users. The subset of similar users can be associated with the first property. Moreover, the method can include updating the event-to-user-ratio based on data derived from the subset of similar users.

In some implementations, the first event can be adding an item to a shopping cart of the website. Additionally, the subset of similar users can be users that have also added an item to a shopping cart of the website.

In some implementations, the first property can be a web browser associated with the first event. Alternatively, in some implementations, the first property can be a country of origin associated with the first event. Alternatively, in some implementations, the first property can be a display resolution associated with the first event.

In some implementations, the subset of similar users can be associated with a first dimension. Additionally, the method can further include assigning, using the machine-learned prediction model, the first dimension to the first pseudo user based on the first property. Moreover, the analytics report can further include information derived from the first dimension being assigned to the first pseudo user.

In some implementations, the first dimension can be the first visit date associated with the first event. Additionally, the first dimension can be assigned to the first pseudo user based on a probability distribution derived from the plurality of identified events. In some implementations, the first dimension can be the gender associated with the first pseudo user.

In some implementations, the method can further include calculating, using the machine-learned prediction model, a number of sessions associated with the plurality of unidentified events based on an event-to-session-ratio and the total number of unidentified events. Additionally, the analytics report can further include information derived from the number of sessions.

In some implementations, the machine-learned prediction model can determine the event-to-session-ratio based on data derived from a plurality of identified events associated with identified users of the website that have accepted identifiers when browsing the website.

In some implementations, the method can further include assigning, using the machine-learned prediction model, the first pseudo user to a plurality of pseudo sessions. Additionally, the method can include assigning, based on a first property of the first event, the first event to a first pseudo session from the plurality of pseudo sessions. Moreover, the analytics report can include information derived from the first pseudo user being assigned to the plurality of pseudo sessions and the first event being assigned to the first pseudo session.

In some implementations, the method can further include determining a sequence of events based on a configuration of the website. Additionally, the method can include determining, using the machine-learned model, a second event from the plurality of unidentified events based on the sequence of events. Moreover, the method can include assigning, using the machine-learned prediction model, the second event to the first pseudo session. The analytics report can include information derived from the second event being assigned to both the first pseudo session and the first pseudo user.

In some implementations, the first event can be associated with a second dimension, and the method can further include assigning, using the machine-learned prediction model, the second dimension to the first pseudo session. The analytics report can include information derived from the second dimension being assigned to both the first pseudo session and the first pseudo user.

In some implementations, the method can further include presenting, in response to a request received from a client computing device, the analytics report on a display of the client computing device.

In some implementations, the machine-learned prediction model can assign the first event to the first pseudo user in real-time at a time event. Additionally, the method can include accessing additional unidentified events for a specific time period after the time event. Moreover, the method can include reassigning the first event to a second pseudo user based on the additional unidentified events. Furthermore, the method can include generating an updated report for the website. The updated report can include information derived from the first event being reassigned to a second pseudo user. Subsequently, the method can include replacing the analytics report that is presented on the display with the updated report.

In some implementations, the machine-learned prediction model can be a regression model.

In some implementations, the method can further include calculating a correction factor based on data obtained from a plurality of days. Additionally, the method can include updating the number of pseudo users associated with the plurality of unidentified events based on the correction factor. Moreover, the method can include determining, based on the correction factor, a number of unique pseudo users that have visited the website over the plurality of days. Furthermore, the analytics report can include information derived from the number of unique pseudo users that have visited the website over the plurality of days.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1A:
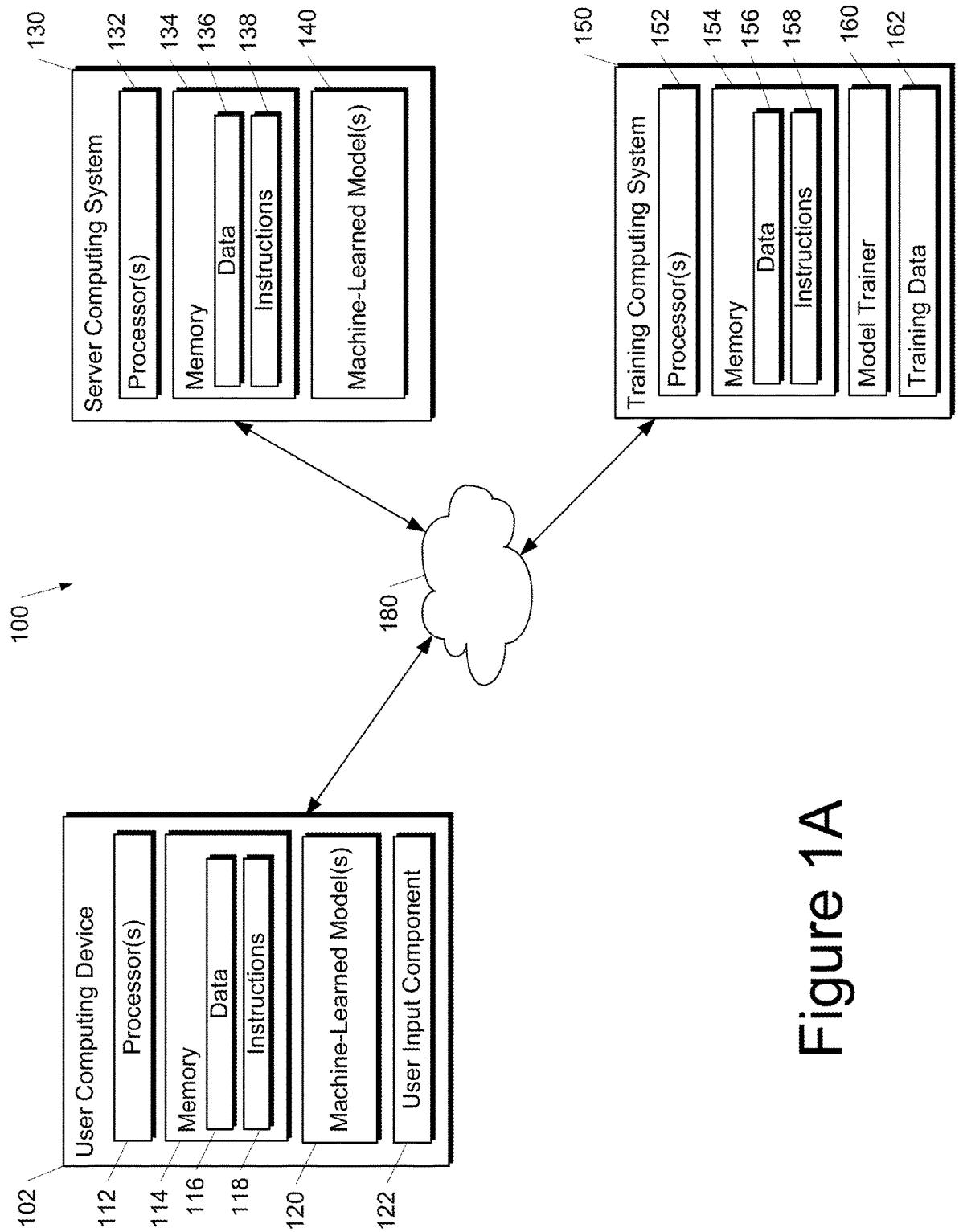
FIG. 1A depicts a block diagram of an example computing system according to example embodiments of the present disclosure.

Example embodiments according to aspects of the present disclosure relate to computing devices having a machine-learned prediction model to generate analytics reports for a website. The reports can be generated based on identified events and unidentified events. Identified events can be associated with users of the website that have consented to have their online activities be sent to the publisher of the website as first-party data. Unidentified events can be associated with events that lack a user identifier. Consent mode is an example of when events may lack a user identifier. In some instances, the user identifier is a stable user identifier. A stable (e.g., durable) user identifier can be: the same user identifier across events within a browser session in the case of consent; the same user identifier for events across multiple days in the case of a platform constraint, or the same user identifier for events across multiple devices (e.g., desktop, mobile). In some implementations, machine-learned prediction models can obtain analytics data without identifiers and perform modeling to estimate behavior data. The analytics data without identifiers can be first-party data obtained from a customer (e.g., administrator of a website or a mobile application). For example, the machine-learned prediction model can model unidentified events associated with pseudo users based on the behavior of similar users who accept user identifiers. The training data used for training the machine-learned prediction models is based on data derived from identified events. The technique described herein can predict analytical data associated with unidentified events by using a machine-learned prediction model. The machine-learned prediction model can estimate a plurality of metrics across a plurality a dimension from unidentified events to generate analytics reports.

In some implementations, the system can utilize a hybrid of probabilistic hard-coded algorithms and machine-learned prediction. For example, the system can utilize a machine-learned prediction model to assign unidentified events to pseudo users, pseudo sessions, and unobservable dimensions. Additionally, the machine-learned prediction model can determine the ratios and algorithms described herein to assign the unidentified events. In some instances, the ratios and hard-coded algorithms can be precomputed by the machine-learned prediction model. Using both types of approaches (e.g., real-time determinations and precomputed ratios/algorithms) simplifies the task for the machine-learned prediction model, permitting the model to be smaller, easier to train, and faster to train. Additionally, by using both types of approach, it allows the system to generate analytics reports from unidentified events in real-time. In some implementations, a processing parameter of the system can be adjusted based on the data from the generated analytics report.

The machine-learned prediction model can generate analytics data by analyzing vast amounts of historical data, identifying correlations and trends between key data points, and using those insights to make accurate predictions about behavior. The machine-learned prediction model can fill gaps for events without user identifiers. The machine-learned model can leverage first-party data obtained by the website to fill gaps in the customer journey and determine insights. The first-party data can include labeled data (e.g., observable measurement) that can be utilized to determine (e.g., estimate, predict) information about unidentified events (e.g., unlabeled data, data that lacks user identifier). For example, gaps in the customer journey can occur when users move across devices and from online-to-offline, browser restrictions, and varying consent choices.

Systems and methods described herein can improve predictions for behavior modeling for unidentified events (e.g., unlabeled data). Behavior modeling can be associated with unidentified events and unobservable dimensions, which may not have a ground truth to train the machine-learning model. Ground truth refers to the actual nature of the problem that is the target of a machine learning model, reflected by the relevant data sets associated with the use case in question. Behavioral modeling can provide insight into the actions beyond conversions that users might make on a website or within a mobile application. The machine-learned prediction model can utilize data derived from events with identifiers to model and analyze events without identifiers. For example, the techniques described herein enables websites to associate users and sessions to answer questions like, "how many new users did I acquire from my last campaign?"

In some implementations, companies may experience data loss from their analytics reporting proportional to the number of events without identifiers. This can result in incomplete measurement scenarios preventing companies from getting answers to questions like:
 a) How many Daily Active Users do I have?
 b) How many new users did I acquire from my last campaign?
 c) What is the user journey from landing on my website to actually making a purchase?
 d) How many of my site visitors are based in Germany vs. the UK?
 e) What is the difference in user behavior between mobile vs. web visitors?

For example, having an accurate count of daily active users can be used by the system to determine how much processing, network bandwidth, and other computing resources may be necessary to reduce website and mobile application crashes. In some implementations, the method described in FIGS. 3-5 can further include adjusting a processing parameter based on the data from the generated analytics report.

In some implementations, the machined-learned prediction model aims at filling the data gap by modeling the events without user identifiers based on events with user identifiers. The training data used for modeling can be based on the consented user data associated with a property that the model can be trained. A property can be a set of analytics reports and data for a website and/or mobile application. The reports and user interface that are generated and presented can vary according to what kind of property a client has selected to view.

For example, the machine-learned prediction model estimates data based on user and session metrics, such as daily active users and conversion rate, which may be unobservable when identifiers (e.g., analytics cookies, user IDs) are not available.

The machined-learned prediction model can generate modeled data for the unidentified events (e.g., unlabeled data). Additionally, the first party data obtained from the website can be referred to as labeled data. For example, labeled data includes data obtained when users visit a client's website and grant consent for analytics cookies. Additionally, when users grant consent for personalization by using an identifier, the data is referred to as labeled data. In some instances, a user can grant consent for personalization by signing into a first-party website or mobile application.

Alternatively, when users do not grant consent to the use of analytics cookies or equivalent mobile application identifiers, events are not associated with a user identifier, and the data is referred to as unidentified events (e.g., unlabeled data). For example, if the system collects ten pageview events, the system cannot observe and report whether those events are associated with ten users or just one user. Instead, the system can use a machine-learned prediction model to analyze unidentified events based on the behavior of similar users who have accepted analytics cookies or equivalent mobile application identifiers.

In some embodiments, the systems and methods according to example aspects of the present disclosure can obtain the above advantages using a machine-learned model framework to generate analytics data and/or reports based on label (e.g., identified events) and unlabeled data (e.g., unidentified events). For example, the machine-learned model framework can include a prediction model that can be trained using labeled data. In this manner, for example, the machine-learned model framework can learn to use the prediction model to generate predictions and analytics data using unlabeled data.

In some embodiments, example systems and methods according to example aspects of the present disclosure can provide for improved storage, management, retrieval, and cross-referencing of data structures in a memory (e.g., in a database). For instance, an example database may contain real-world data structures descriptive of various unidentified events (e.g., unlabeled data). Another database may also contain data structures descriptive of identified events (e.g., labeled data). Based on the labeled data, an example computing system according to the present disclosure can learn an intermediate set of data structures (e.g., a set of learned parameters of the machine-learned prediction model) to map the unidentified events to pseudo users, pseudo sessions, and unobservable dimensions. In some embodiments, for instance, the intermediate set of data structures may function to provide for association of the unlabeled data in the database with one or more conversion labels to enable improved storage and/or retrieval of the unlabeled data (e.g., indexed storage based on the one or more labels, retrieval based on the one or more labels, etc.).

In some embodiments, for instance, the intermediate set of data structures may function to provide for the processing and execution of a query over the unidentified events. For instance, a query may include a query to obtain analytics data associated with the unidentified events. The unidentified events may be assigned to pseudo users, pseudo sessions, and unobservable dimensions in order to quickly generate analytics data and/or reports. Advantageously, however, the intermediate set of data structures may function map the unidentified events to pseudo users, pseudo sessions, and unobservable dimensions. In this manner, for example, example systems and methods according to aspects of the present disclosure can provide for the execution and processing of queries over an input dataset even when such queries might not be available otherwise (e.g., due to data-poor or communication-restricted implementations).

In some embodiments, example systems and methods according to example aspects of the present disclosure can provide for determining a relevance among unidentified events (e.g., unlabeled data). For example, a relevance may be determined along a dimension for which there is no or incomplete labeling in the unidentified events data. For instance, a temporal relevance may be determined over the unidentified events data even when the data might lack complete (or any) labeling of temporal relationships. For example, in some embodiments, the unidentified events data can include a timestamp (e.g., date, time, date and time) associated with the event, but the unidentified events data might lack timestamps for any subsequent event when the prediction model determines that there may be a sequence of events.

In some implementations, the machine-learned prediction model can be updated by modifying one or more of the parameters of the model. For example, the system can check the accuracy of the model by performing a holdback validation and modify parameter(s) of the model based on the holdback validation. The holdback validation can maintain the accuracy of the models by comparing estimated user data to a portion of observed user data that was held back from model training, and the information is used to tune (e.g., modify one or more parameters) the models. Additionally, the system can communicate changes to the client that might have an impact on the data.

The systems and methods of the present disclosure provide several technical effects and benefits. Aspects of the present disclosure can provide several technical improvements to machine-learning prediction models by reducing the processing time to generate reports in real-time. By utilizing different types of ratios to determine the number of users and sessions, the system can reduce the amount of modeling needed to generate the data for the reports. By training and/or running the models with the different types of ratios, where some of them can be precomputed, the computational resources (e.g., processor time, memory usage, etc.) to train and/or run the models can be reduced. Systems and methods described herein can improve the processing speed of generating reports and also reduce the computing resources needed to perform the modeling to generate the data for the reports. As a result, the system can achieve state-of-the-art performance while maintaining accuracy of the predicted data. Additionally, systems and methods described herein can adjust a processing parameter of the system based on the data from the generated analytics report.

With reference now to the Figures, example embodiments of the present disclosure will be discussed in further detail.

Multi-Day Correction Implementation

In the multi-day correction implementations, given that the consented-user identifiers can persist over time, while pseudo-user identifiers may persist only for one day, the system can update (e.g., correct) the analytics reports by using more accurate data that is accessed over a plurality of days. Therefore, when the system determines and reports the unique number of consented users over an arbitrary date range, the system can simply count the number of unique identifiers in that time window.

For example, when there are 100 consented users who visited the website two days ago, 120 consented users who visited the website yesterday, and 30 users who visited on both days, the number of unique consented users over the 2-day period would be (100+120−30)=190.

In some implementations, the system does not allow the identifiers assigned to pseudo users to persist across the one-day boundary. Therefore, in some instances, the system includes a correction factor (also referred as a "multi-day correction") to adjust for overcounting pseudo-users over an arbitrary date range. The correction factor can be the ratio of unique consented users over the date range relative to the daily consented users over the date range.

Using the example above, over the 2-day period, the correction factor would be (100+120−30)/(100+120)=190/220=0.86.

Therefore, if the system has determined that there are 220 pseudo-users two days ago and 250 pseudo-users yesterday, the corrected number of deduplicated pseudo-users over the two-day period would be (220+250)*0.86=404. Therefore, the system can determine that there are 404 unique pseudo-users during the two days.

Additionally, after the deduplication process, the system can determine that there are 46 (220 pseudo-users on day 1+250 pseudo-users on day 2-404 unique pseudo users during both days) pseudo-users that visited the website on both days.

In some implementations, the multi-day correction can be applied at query time when the report is generated by the customer (e.g., the system can compute the correction when the report is requested and does not store the correction factors in the system's backend).

In some implementations, the method can further include calculating a correction factor based on data obtained from a plurality of days. Additionally, the method can include updating the number of pseudo users associated with the plurality of unidentified events based on the correction factor. Moreover, the method can include determining, based on the correction factor, a number of unique pseudo users that have visited the website over the plurality of days. Furthermore, the analytics report can include information derived from the number of unique pseudo users that have visited the website over the plurality of days.

Example Devices and Systems

FIG. 1A depicts a block diagram of an example computing system 100 that performs image editing according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more models 120. For example, the models 120 (e.g., prediction model) can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example models 120 are discussed with reference to FIGS. 2-5.

In some implementations, the one or more models 120 can be received from the server computing system 130 over network 180, stored in the user computing device memory 114, and then used or otherwise implemented by the one or more processors 112. In some implementations, the user computing device 102 can implement multiple parallel instances of a single model 120.

More particularly, the models 120 can be trained using a training computing system 150 with a set of training data 162 to train the parameters of the model to optimize the model. The training computing system 162 may rely on observed data to add efficiency and precision to the training model. Additionally, training data 162 may also be first-party data. Moreover, training data 162 may include data obtained when users visit a client's website and grant consent for analytics cookies. Furthermore, training data 162 may include data obtained when users accept identifiers.

Additionally, or alternatively, one or more models 140 can be included in or otherwise stored and implemented by the server computing system 130 that communicates with the user computing device 102 according to a client-server relationship. For example, the models 140 can be implemented by the server computing system 140 as a portion of a web service (e.g., a website). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-6.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the image editing models 120 and/or 140 based on a set of training data 162. The training data 162 can include, for example, observed data and/or first-party data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general-purpose processor. For example, in some implementations, the model trainer 160 includes program files stored on a storage device, loaded into a memory, and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
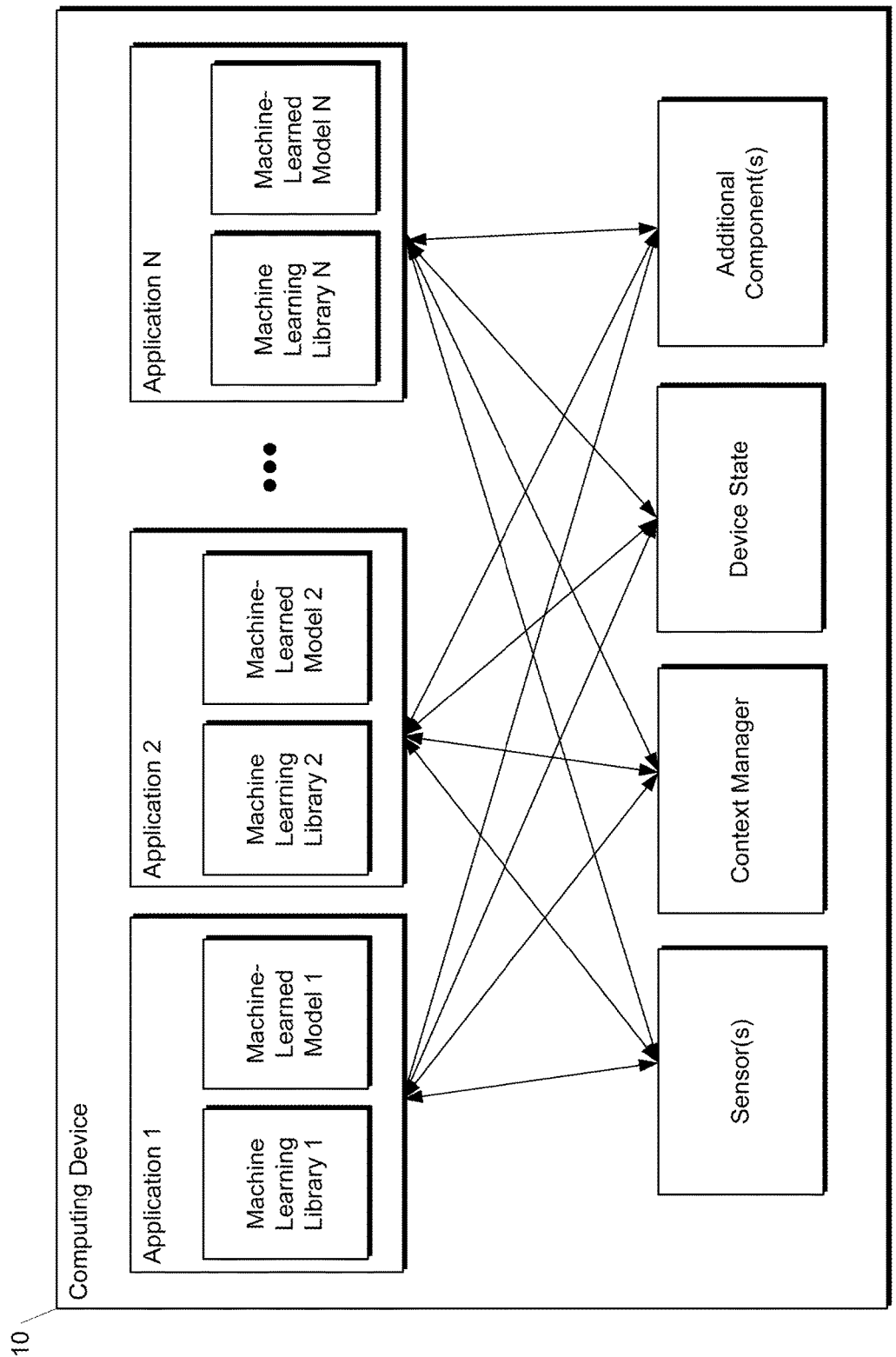
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
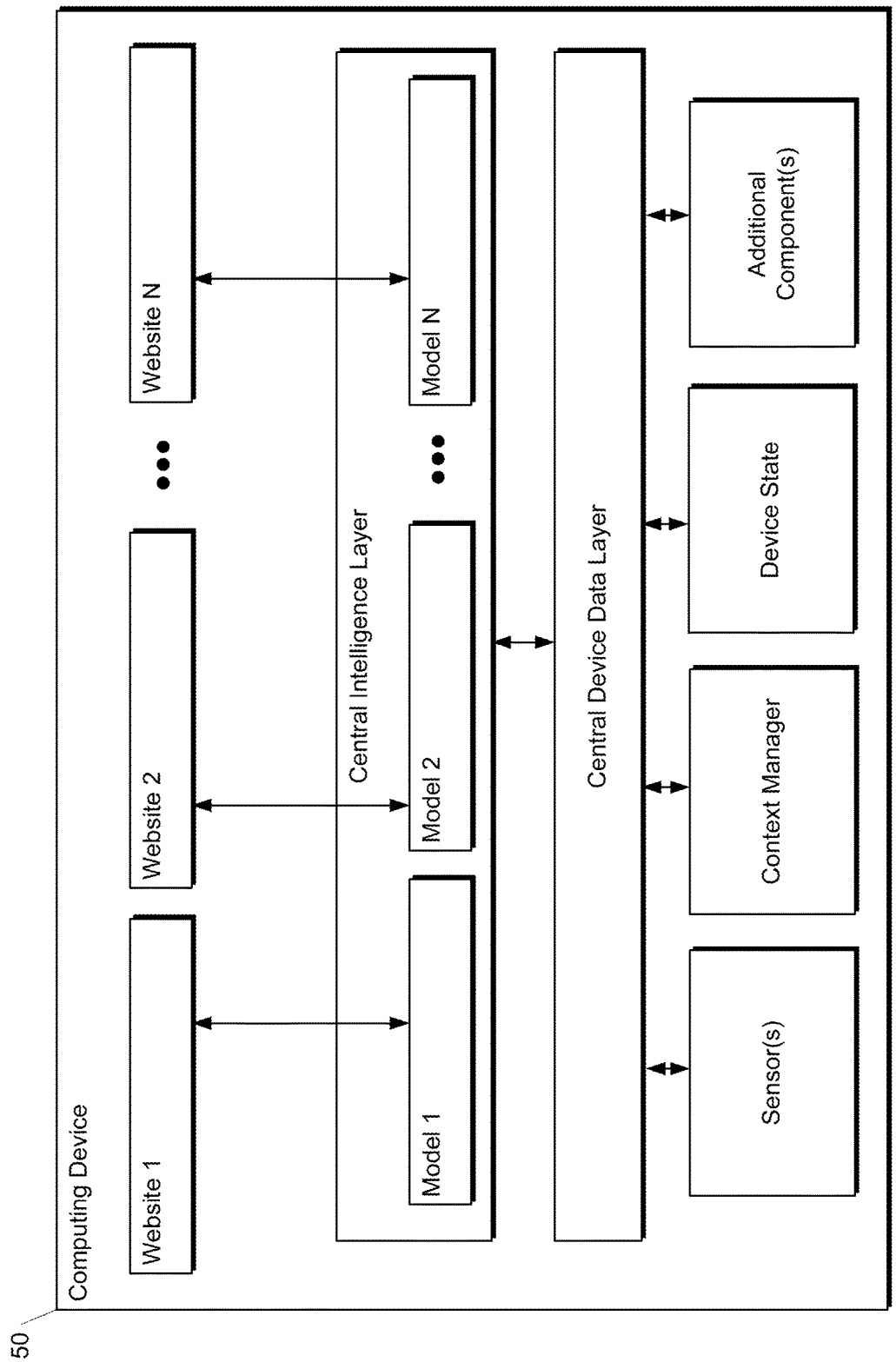
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of websites and/or mobile applications (e.g., applications 1 through N). Each website and/or application can be in communication with a central intelligence layer. Example websites can include a commerce (e.g., shopping) website, a media streaming website, a social network website, etc. Example mobile applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each website and/or application, and be managed by the central intelligence layer. In other implementations, two or more websites and/or applications can share a single machine-learned model. For example, in some implementations, the central intelligence layer can provide a single model (e.g., a single model) for all of the websites and/or applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
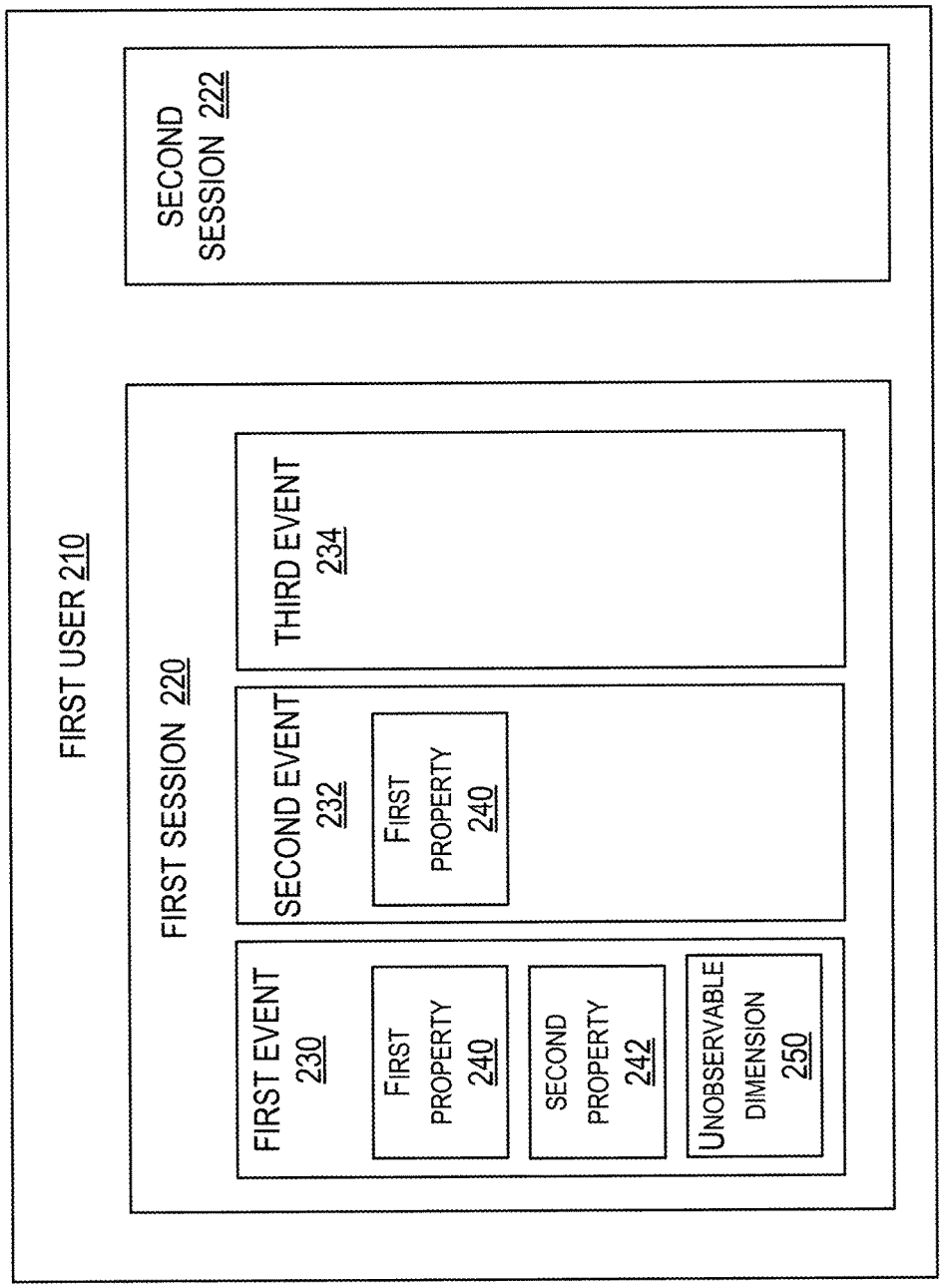
FIG. 2 depicts a block diagram of an example model for determining data for a report, according to example embodiments of the present disclosure.

FIG. 2 depicts a block diagram of an example machine-learned prediction model 200 for determining analytics data for a report, according to example embodiments of the present disclosure. In some implementations, the computing system (user computing device 102, server computing device 130, training computing device 150, computing device 10, computing device 50) can include a machine-learned prediction model 200.

In some implementations, the machine-learned prediction model 200 can be a four-layered model. The machine-learned prediction model 200 can include a first-layer model to determine pseudo users (e.g., first user 210) associated with a plurality of unidentified events of a website. The pseudo users can be users associated with unidentified events. For example, if the system collects ten pageview events, the system can determine the number of pseudo users (i.e., between one to ten) that are associated with the ten pageview events.

In some implementations, the machine-learned prediction model 200 can include a second-layer model to determine sessions (e.g., first session 220, second session 222) associated with a plurality of unidentified events of a website. A pseudo user may be associated with one or more sessions. For example, as illustrated in FIG. 2, the first user 210 can be associated with a first session 220 and a second session 222. Continuing with the example of the ten pageview events, the system can determine the number of sessions associated with the ten pageview events. In some instances, the number of pseudo users will be less than the number of sessions, because one pseudo user may have a plurality of sessions. Sessions can sometimes be referred to as user traffic.

Figure 3:
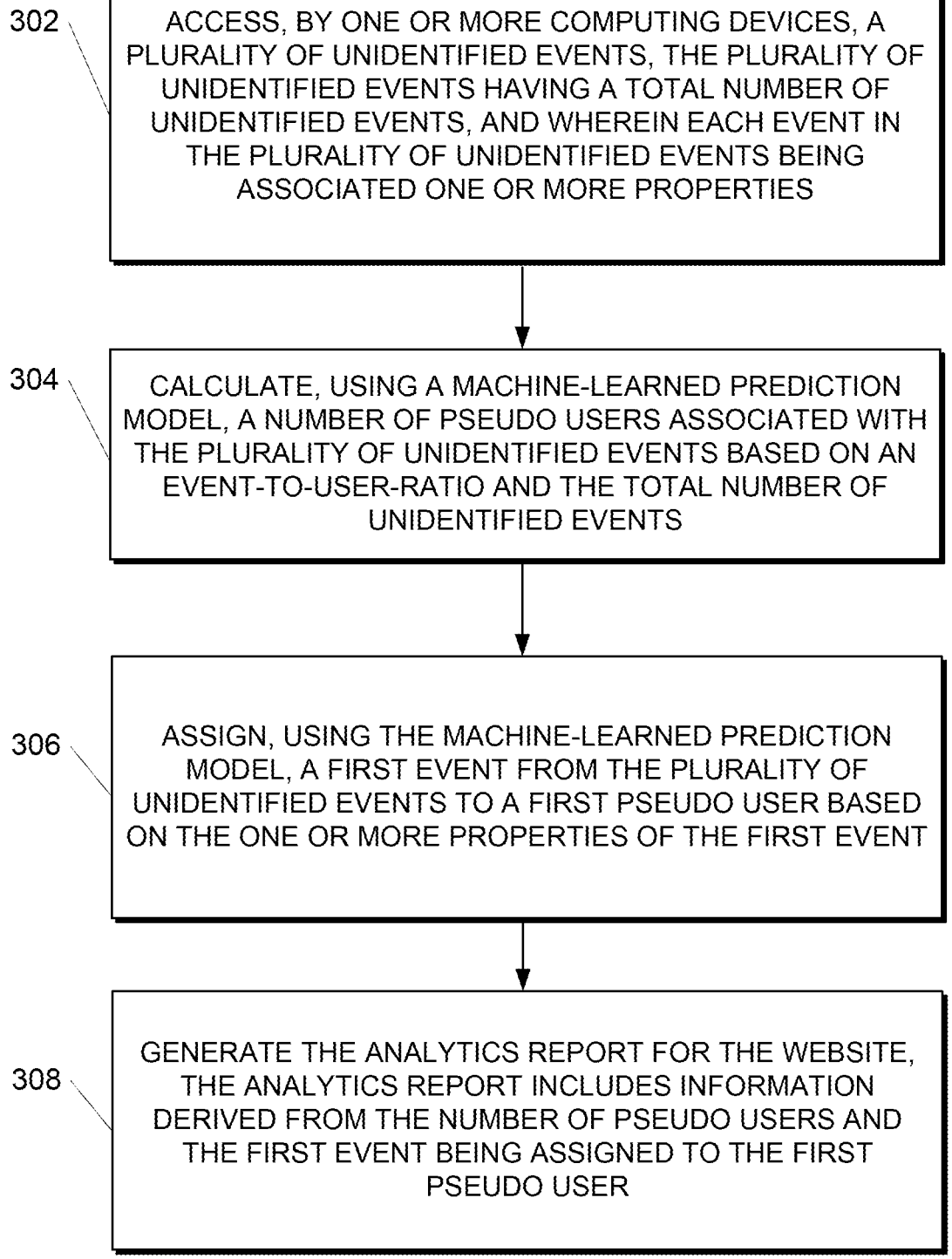
FIG. 3 depicts a flow chart diagram of an example for generating an analytics report for a website, according to example embodiments of the present disclosure.
Figure 4:
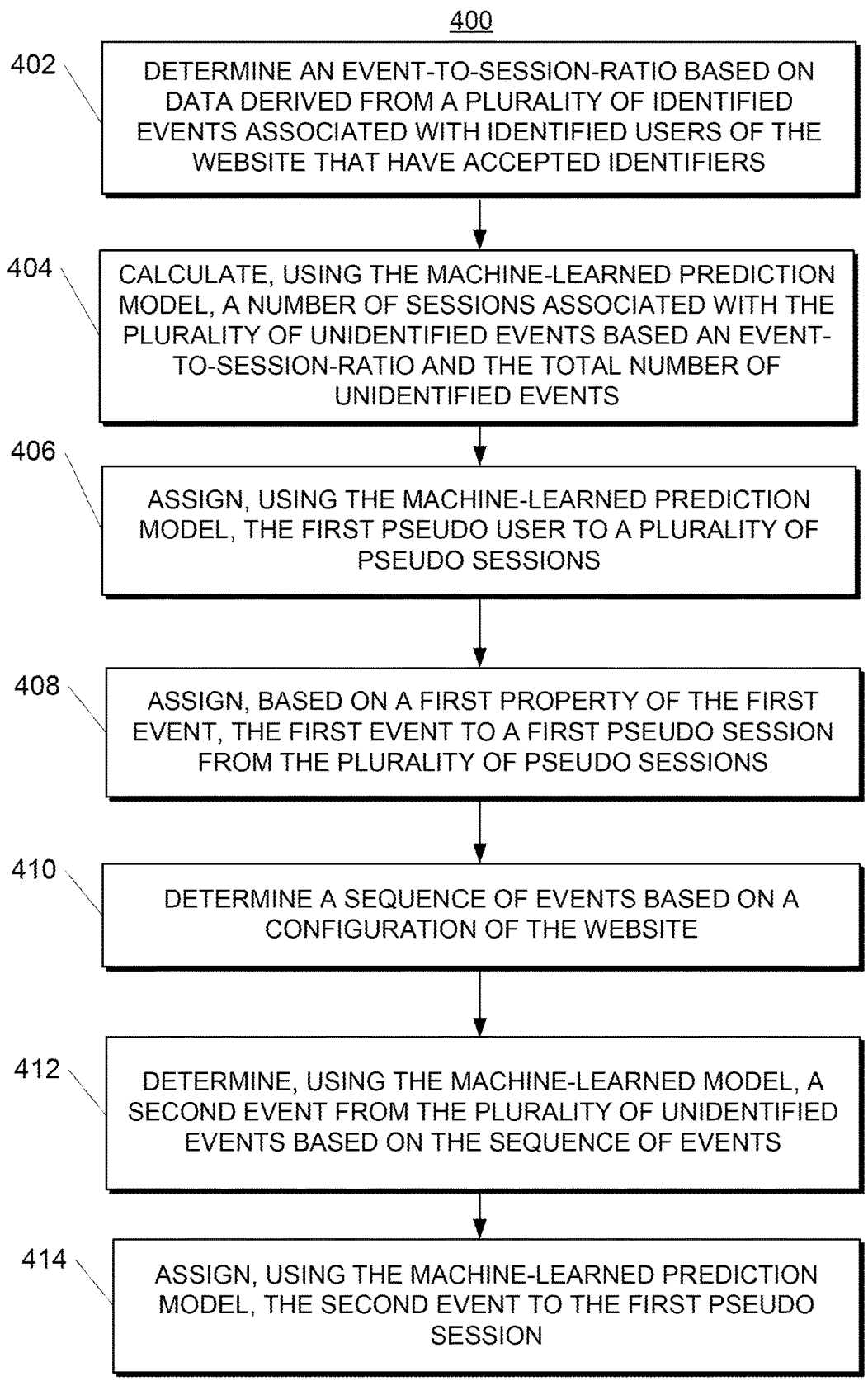
FIG. 4 depicts a flow chart diagram for assigning an event to a session, according to example embodiments of the present disclosure.
Figure 5:
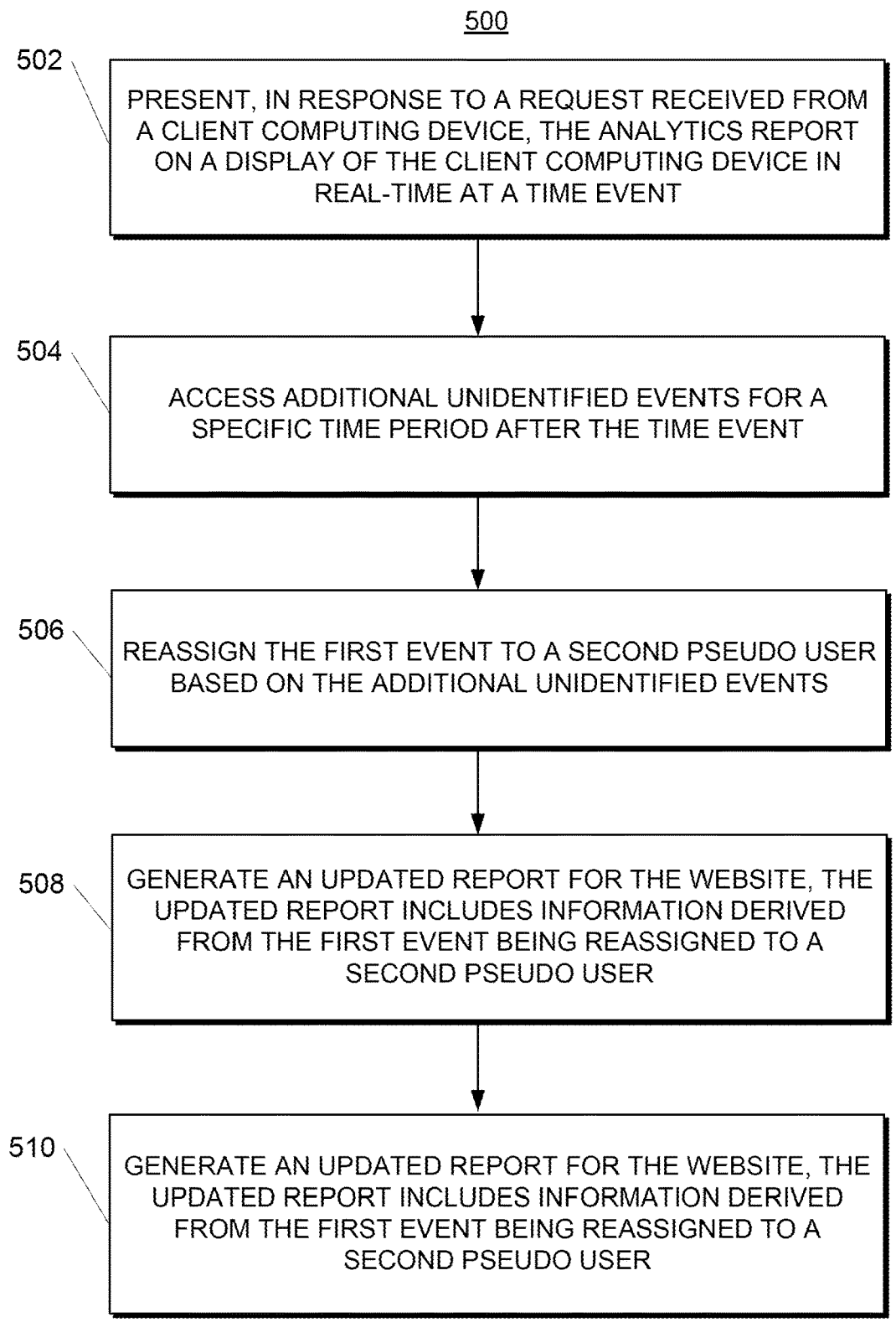
FIG. 5 depicts a flow chart diagram for presenting a report in real-time and updating the report afterwards based on additional information, according to example embodiments of the present disclosure.

In some implementations, the machine-learned prediction model 200 can include a third-layer model to assign unidentified events (e.g., first event 230, second event 232, third event 234) to a pseudo user and/or a session. For example, as illustrated in FIG. 2, the first event 230, the second event 232, and the third event 234 are assigned to both the first session 220 and the first user. FIGS. 3-5 describe methods for assigning unidentified events to a pseudo user and/or a session, according to example embodiments of the present disclosure.

In some implementations, the machine-learned prediction model 200 can include a fourth-layer model to assign unobservable dimensions (e.g., first visit date, number of website visits per day, previous event, sequential event, gender) to a pseudo user and/or a session. The unobservable dimensions can be assigned based on the properties associated with an event that is already assigned to a pseudo user or session. In some instances, the system can include hundreds of unobservable dimensions that the system can assign to a pseudo user or session. For example, as illustrated in FIG. 2, the unobservable dimension 250 is assigned to both the first session 220 and the first user. FIGS. 3-5 describe methods for assigning unobservable dimensions to a pseudo user and/or a session, according to example embodiments of the present disclosure.

Example Methods

FIG. 3 depicts a flow chart diagram of an example for generating an analytics report for a website, according to example embodiments of the present disclosure. Although FIG. 3 depicts steps performed in a particular order for purposes of illustration and discussion, the methods of the present disclosure are not limited to the particularly illustrated order or arrangement. The various steps of method 300 can be omitted, rearranged, combined, and/or adapted in various ways without deviating from the scope of the present disclosure.

In some implementations, method 300 can be performed by a computing system, such as computing device 102, server computing system 130, training computing system 150, computing device 10, computing device 50. Additionally, the computing system can use one or more processors (e.g., processor(s) 112, 132, 152) to perform method 300.

At 302, the computing system can access a plurality of unidentified events. For example, the unidentified events can be associated with events without a user identifier (e.g., stable user identifier). In some instances, when users do not grant consent to the use of analytics cookies or equivalent mobile application identifiers, the events can be without a user identifier. The plurality of unidentified events have a total number of unidentified events. Each event in the plurality of unidentified events can be associated with one or more properties.

In some instances, the machine-learned prediction model can be a regression model. Additionally, example machine-learned prediction models can include neural networks or other multi-layer non-linear models. Example neural networks include feed forward neural networks, deep neural networks, recurrent neural networks, and convolutional neural networks.

In some instances, the machine-learned prediction model can be trained using various training or learning techniques, such as, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

At 304, the computing system can calculate, using a machine-learned prediction model, a number of pseudo users associated with the plurality of unidentified events based on an event-to-user-ratio and the total number of unidentified events. In some instances, the computing system can calculate, using a machine-learned prediction model, a number of pseudo users associated with the plurality of unidentified events based on an event-to-user-ratio.

In some implementations, the machine-learned prediction model can determine the event-to-user-ratio based on data derived from a plurality of identified events associated with identified users of the website that have accepted identifiers. For example, the users can accept analytics cookies when browsing the website. In another example, the users can accept a user identifier when interfacing or browsing a mobile application. In some instances, the data derived from the plurality of identified events can be first-party data from the website or a mobile application.

At 306, the computing system can assign, using the machine-learned prediction model, a first event from the plurality of unidentified events to a first pseudo user based on the one or more properties of the first event.

In some implementations, the first event can be associated with a first property. Additionally, the computing system can select, based on the first property of the first event, a subset of similar users from the plurality of identified users. The subset of similar users can be associated with the first property. Moreover, the computing system can update the event-to-user-ratio based on data derived from the subset of similar users. The updated event-ratio can be utilized by the computing system to determine the number pseudo users at operation 304.

In some implementations, the first property is a web browser associated with the first event. Alternatively, in some implementations, the first property is a country of origin associated with the first event. Alternatively, in some implementations, the first property is a display resolution associated with the first event. The machined-learned prediction model can assign multiple events that have the first property to a pseudo user and/or pseudo session. For example, a plurality of events that have a specific display resolution can be assigned to the first pseudo user, and other events with a different display resolution are filtered out from being assigned to the first pseudo user, since a user would not have different display resolutions during a session.

In some instances, the first event can be adding an item to a shopping cart of the website, and the subset of similar users are users that added an item to a shopping cart of the website. In some instances, the first event can be purchasing an item from a shopping cart of the website, and the subset of similar users are users that purchased an item to a shopping cart of the website. The machine-learned prediction model can determine a journey for a session in order to predict a correlation between the first event and a previous unidentified event. The journey for the session can also be utilized to predict a correlation between the first event and subsequent unidentified event. For example, a journey of a session can include clicking on a product, then adding the product on a shopping cart, and subsequently purchasing the product from the shopping cart. Additionally, events can be associated with the journey, such as, but not limited to, inputting credit card information, inputting shipping address, and other events associated with purchasing a product.

In some implementations, the subset of similar users can be associated with a first dimension. For example, the first dimension can be an unobservable dimension such as a first visit date. In another example, the first dimension can be a gender associated with the first pseudo user. Additionally, the computing system can assign, using the machine-learned prediction model, the first dimension to the first pseudo user based on the first property. In some instances, the first dimension can be the first visit date associated with the first event, and the first dimension is assigned to the first pseudo user based on a probability distribution derived from the plurality of identified events. For example, the probability distribution can indicate that there is a high likelihood that the first visit date was a specific number of days prior, and that date can be assigned as the first visit date of the first pseudo user. Moreover, the analytics report can provide information derived from the first dimension being assigned to the first pseudo user.

At 308, the computing system can generate the analytics report for the website. In some instances, the computing system can generate the analytics report for a mobile application. The analytics report can include information derived from the number of pseudo users and the first event being assigned to the first pseudo user. In some instances, the computing system can generate the analytics report for a mobile application.

In some implementations, the method can further include calculating a correction factor based on data obtained from a plurality of days. Additionally, the method can include updating the number of pseudo users associated with the plurality of unidentified events based on the correction factor. Moreover, the method can include determining, based on the correction factor, a number of unique pseudo users that have visited the website over the plurality of days. Furthermore, the analytics report can include information derived from the number of unique pseudo users that have visited the website over the plurality of days.

In some implementations, the method further includes adjusting a processing parameter (e.g., processing power, memory capacity, network bandwidth) based on the data derived from the analytics report generated at 308.

FIG. 4 depicts a flow chart diagram for assigning an event to a session, according to example embodiments of the present disclosure. Although FIG. 4 depicts steps performed in a particular order for purposes of illustration and discussion, the methods of the present disclosure are not limited to the particularly illustrated order or arrangement. The various steps of method 400 can be omitted, rearranged, combined, and/or adapted in various ways without deviating from the scope of the present disclosure.

In some implementations, the operations method 400 can be combined with the operations of method 300 and/or method 500. For example, operation 402 can be performed after operation 304 of method 300.

At 402, the computing system, using the machine-learned prediction model, can determine an event-to-session-ratio based on data derived from a plurality of identified events associated with identified users of the website that have accepted identifiers.

At 404, the computing system can calculate, using the machine-learned prediction model, a number of sessions associated with the plurality of unidentified events based on an event-to-session-ratio and the total number of unidentified events. Additionally, the analytics report generated at 308 can include information derived from the number of sessions.

At 406, the computing system can assign, using the machine-learned prediction model, the first pseudo user to a plurality of pseudo sessions.

At 408, the computing system can assign, based on a first property of the first event, the first event to a first pseudo session from the plurality of pseudo sessions. Additionally, the analytics report generated at 308 can include information derived from the first pseudo user being assigned to the plurality of pseudo sessions and the first event being assigned to the first pseudo session.

At 410, the computing system can determine a sequence of events based on a configuration of the website. For example, the sequence of events can include a session with a user starting a journey at the home page (i.e., a first event), then the user clicks on a product page (i.e., a second event), then the user selects a product from the product page to be added to a shopping cart (i.e., a third event), then the user clicks a checkout page to purchase the selected product (i.e., a fourth event), and then the user enters credit card and shipping information to finalize the purchase of the selected product (e.g., fifth event).

At 412, the computing system can determine, using the machine-learned model, a second event from the plurality of unidentified events based on the sequence of events. Continuing with the purchasing of a product example, the computing system can assign both the first and second event to the first pseudo user, where the first event is the opening of the home page of the website, and the second event is the opening of a product page of the website.

At 414, the computing system can assign, using the machine-learned prediction model, the second event to the first pseudo session. Continuing with the purchasing of a product example, the computing system can assign both the first event and the second event to the first pseudo session, where the opening of the home page is the first event, and the opening of the product page is the second event. Additionally, the analytics report generated at 308 can include information derived from the second event being assigned to both the first pseudo session and the first pseudo user.

In some implementations, the first event can be associated with a second dimension. Additionally, the computing system can assign, using the machine-learned prediction model, the second dimension to the first pseudo session. Moreover, the analytics report generated at 308 can include information derived from the second dimension being assigned to both the first pseudo session and the first pseudo user.

FIG. 5 depicts a flow chart diagram for presenting a report in real-time and updating the report afterwards based on additional information, according to example embodiments of the present disclosure. Although FIG. 5 depicts steps performed in a particular order for purposes of illustration and discussion, the methods of the present disclosure are not limited to the particularly illustrated order or arrangement. The various steps of method 500 can be omitted, rearranged, combined, and/or adapted in various ways without deviating from the scope of the present disclosure.

In some implementations, the operations method 400 can be combined with the operations of method 300 and/or method 400. For example, operation 502 can be performed after operation 308 of method 300.

At 502, the computing system can present, in response to a request received from a client computing device, the analytics report on a display of the client computing device. In some instances, the analytics report is present in real-time or near real-time. The presentation of the analytics report can be at a time event. Additionally, the machine-learned prediction model can assign the first event to the first pseudo user in real-time at a time event.

At 504, the computing system can access additional unidentified events for a specific time period after the time event. For example, the computing system can access all of the unidentified events for a specific period of time (e.g., 12 hours, 24 hours). The additionally unidentified events can improve the predictions of the machine-learned prediction model.

At 506, the computing system can reassign the first event to a second pseudo user based on the additional unidentified events. For example, the machine-learned model can make a first prediction in real-time with regards to the first event with limited information that is obtained in real-time. Additionally, the machine-learned model can make a more accurate prediction after the time event based on the additional unidentified events that have been captured for the specific period of time.

At 508, the computing system can generate an updated report for the website. For example, the updated report can include information derived from the first event being reassigned to a second pseudo user.

At 510, the computing system can replace the analytics report that is presented on the display at 502 with the updated report.

Figure 6:
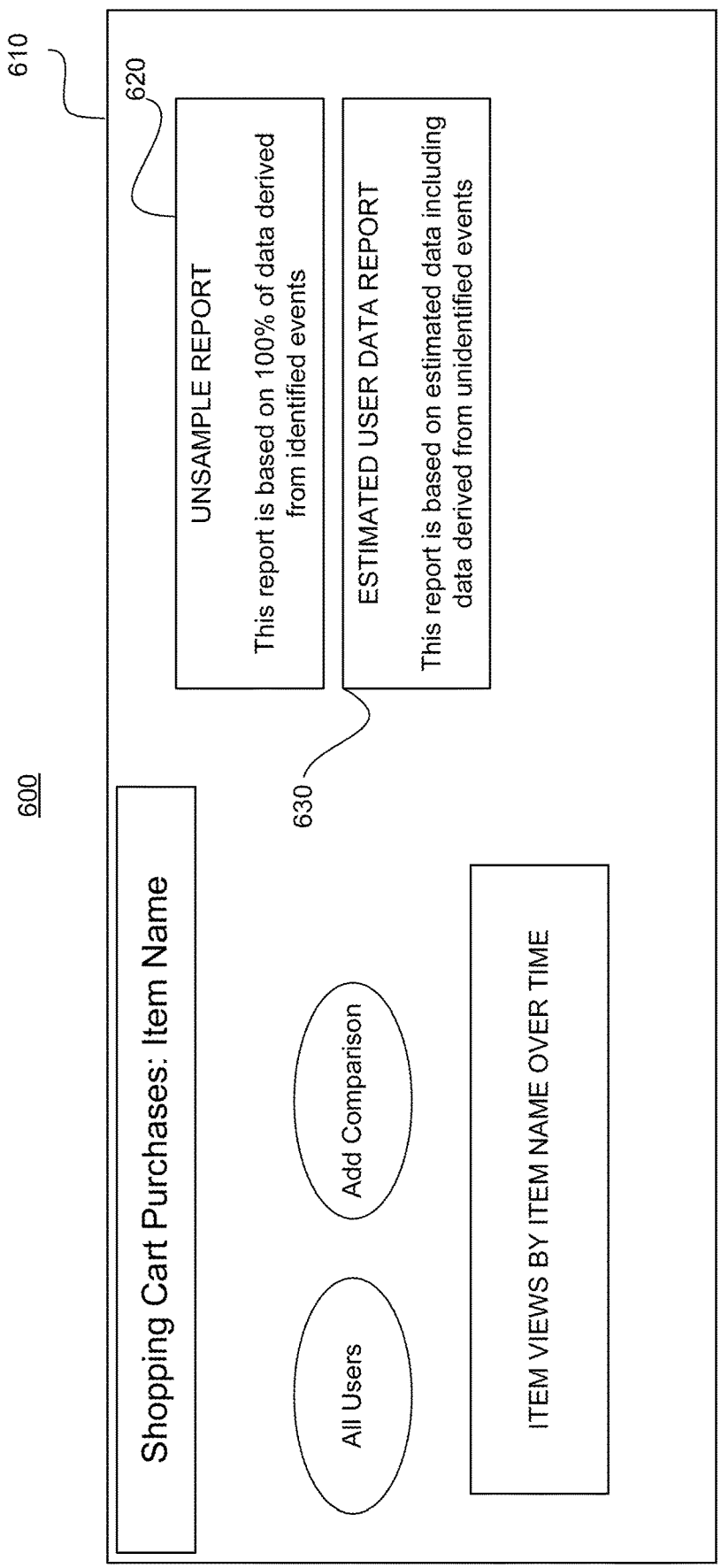
FIG. 6 depicts an illustration of a graphical user interface presenting a first report and a second report, according to example embodiments of the present disclosure.

FIG. 6 depicts an illustration 600 of a graphical user interface 610 presenting a first report and a second report, according to example embodiments of the present disclosure. In some implementations, the graphical user interface 610 can present an option for a website owner to view a first report 620 based on available first-party data, and/or view a second report 630 that is generated by the machine-learned prediction model. The first report 620 can be generated based on data derived from a plurality of identified events associated with identified users of the website that have accepted identifiers. The second report 630 can be generated based on the techniques described in FIGS. 3-5. As illustrated in FIG. 6, the system can seamlessly integrate modeled data and observed data in combined or separated reports.

Additional Disclosure

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The technology discussed herein refers to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer-implemented method, the method comprising:
   accessing, by one or more computing devices, a plurality of unidentified events, the plurality of unidentified events having a total number of unidentified events, and wherein each event in the plurality of unidentified events being associated with one or more properties;
   calculating, using a machine-learned prediction model, a number of pseudo users associated with the plurality of unidentified events based on an event-to-user-ratio and the total number of unidentified events, calculating, using the machine-learned prediction model, a number of sessions associated with the plurality of unidentified events based on an event-to-session-ratio and the total number of unidentified events, wherein the machine-learned prediction model determines the event-to-session-ratio based on data derived from a plurality of identified events associated with identified users of the website that have accepted identifiers when browsing the website;
   assigning, using the machine-learned prediction model, a first event from the plurality of unidentified events to a first pseudo user based on the one or more properties of the first event;
      generating an analytics report for a website, the analytics report includes information derived from the number of pseudo users, the number of sessions, and the first event being assigned to the first pseudo user; and
   adjusting a parameter of the machine-learned prediction model based data derived from the analytics report, the data derived from the analytics report includes the number of pseudo users or the number of sessions.

2. The computer-implemented method of claim 1, wherein the unidentified events are associated with events without a user identifier, and wherein the machine-learned prediction model determines the event-to-user-ratio based on data derived from a plurality of identified events associated with a plurality of identified users of the website that have accepted identifiers when browsing the website.

3. The computer-implemented method of claim 2, wherein the data derived from the plurality of identified events is first-party data from the website.

4. The computer-implemented method of claim 2, wherein the first event is associated with a first property, the method further comprising:
   selecting, based on the first property of the first event, a subset of similar users from the plurality of identified users, wherein the subset of similar user are associated with the first property; and
   updating the event-to-user-ratio based on data derived from the subset of similar users.

5. The computer-implemented method of claim 4, wherein the first event is adding an item to a shopping cart of the website, and wherein the subset of similar users are users that added an item to a shopping cart of the website.

6. The computer-implemented method of claim 4, wherein the first property is a web browser associated with the first event, a country of origin associated with the first event, or a display resolution associated with the first event.

7. The computer-implemented method of claim 4, wherein the subset of similar users are associated with a first dimension, the method further compiling:
   assigning, using the machine-learned prediction model, the first dimension to the first pseudo user based on the first property; and
   wherein the analytics report further includes information derived from the first dimension being assigned to the first pseudo user.

8. The computer-implemented method of claim 7, wherein the first dimension is first visit date associated with the first event, and the first dimension is assigned to the first pseudo user based on a probability distribution derived from the plurality of identified events.

9. The computer-implemented method of claim 1, the method further comprising:
   assigning, using the machine-learned prediction model, the first pseudo user to a plurality of pseudo sessions;
   assigning, based on a first property of the first event, the first event to a first pseudo session from the plurality of pseudo sessions; and
   wherein the analytics report further includes information derived from the first pseudo user being assigned to the plurality of pseudo sessions and the first event being assigned to the first pseudo session.

10. The computer-implemented method of claim 1, the method further comprising:
    determining a sequence of events based on a configuration of the website;
    determining, using the machine-learned model, a second event from the plurality of unidentified events based on the sequence of events;
    assigning, using the machine-learned prediction model, the second event to the first pseudo session; and
    wherein the analytics report further includes information derived from the second event being assigned to both the first pseudo session and the first pseudo user.

11. The computer-implemented method of claim 1, wherein the first event is associated with a second dimension, the method further comprising:
    assigning, using the machine-learned prediction model, the second dimension to the first pseudo session; and
    wherein the analytics report further includes information derived from the second dimension being assigned to both the first pseudo session and the first pseudo user.

12. The computer-implemented method of claim 1, the method further comprising:
    presenting, in response to a request received from a client computing device, the analytics report on a display of the client computing device.

13. The computer-implemented method of claim 12, wherein the machine-learned prediction model assigns the first event to the first pseudo user in real-time at a time event, the method further comprising:
- accessing additional unidentified events for a specific time period after the time event;
- reassigning the first event to a second pseudo user based on the additional unidentified events;
- generating an updated report for the website, the updated report includes information derived from the first event being reassigned to a second pseudo user; and
- replacing the analytics report that is presented on the display with the updated report.

14. The computer-implemented method of claim 1, wherein the machine-learned prediction model is a regression model.

15. The computer-implemented method of claim 1, the method further comprising:
- calculating a correction factor based on data obtained from a plurality of days; and
- updating the number of pseudo users associated with the plurality of unidentified events based on the correction factor.

16. The computer-implemented method of claim 15, the method further comprising:
- determining, based on the correction factor, a number of unique pseudo users that have visited the website over the plurality of days; and
- wherein the analytics report further includes information derived from the number of unique pseudo users that have visited the website over the plurality of days.

17. The computer-implemented method of claim 1, the method further comprising:
- adjusting a processing parameter based on data from the generated analytics report.

18. A computing system for generating an analytics report for a website, comprising:
- one or more processors; and
- one or more non-transitory computer-readable media that collectively store:
  - a machine-learned prediction model, wherein the machine-learned prediction model is configured to generate an event-to-user-ratio based on data derived from a plurality of identified events associated with identified users of the website that have accepted identifiers; and
  - instructions that, when executed by the one or more processors, cause the computing system to perform operations, the operations comprising:
    - accessing a plurality of unidentified events, the plurality of unidentified events having a total number of unidentified events, and wherein each event in the plurality of unidentified events being associated with one or more properties;
    - calculating, using the machine-learned prediction model, a number of pseudo users associated with the plurality of unidentified events based on the event-to-user-ratio and the total number of unidentified events;
    - calculating, using the machine-learned prediction model, a number of sessions associated with the plurality of unidentified events based on an event-to-session-ratio and the total number of unidentified events, wherein the machine-learned prediction model determines the event-to-session-ratio based on data derived from a plurality of identified events associated with identified users of the website that have accepted identifiers when browsing the website;
    - assigning, using the machine-learned prediction model, a first event from the plurality of unidentified events to a first pseudo user based on the one or more properties of the first event;
    - generating the analytics report for the website, the analytics report includes information derived from the number of pseudo users, the number of sessions, and the first event being assigned to the first pseudo user; and
    - adjusting a parameter of the machine-learned prediction model based data derived from the analytics report, the data derived from the analytics report includes the number of pseudo users or the number of sessions.

19. One or more non-transitory computer-readable media comprising instructions that when executed by one or more computing devices cause the one or more computing devices to perform operations comprising:
- accessing a plurality of unidentified events, the plurality of unidentified events having a total number of unidentified events, and wherein each event in the plurality of unidentified events being associated with one or more properties;
- calculating, using a machine-learned prediction model, a number of pseudo users associated with the plurality of unidentified events based on an event-to-user-ratio and the total number of unidentified events;
- calculating, using the machine-learned prediction model, a number of sessions associated with the plurality of unidentified events based on an event-to-session-ratio and the total number of unidentified events, wherein the machine-learned prediction model determines the event-to-session-ratio based on data derived from a plurality of identified events associated with identified users of the website that have accepted identifiers when browsing the website;
- assigning, using the machine-learned prediction model, a first event from the plurality of unidentified events to a first pseudo user based on the one or more properties of the first event;
- generating an analytics report for a website, the analytics report includes information derived from the number of pseudo users, the number of sessions, and the first event being assigned to the first pseudo user; and
- adjusting a parameter of the machine-learned prediction model based data derived from the analytics report, the data derived from the analytics report includes the number of pseudo users or the number of sessions.

* * * * *